Aug. 6, 1940.  O. G. RIESKE  2,210,006
FOOD GRINDING MACHINE
Filed Oct. 27, 1937
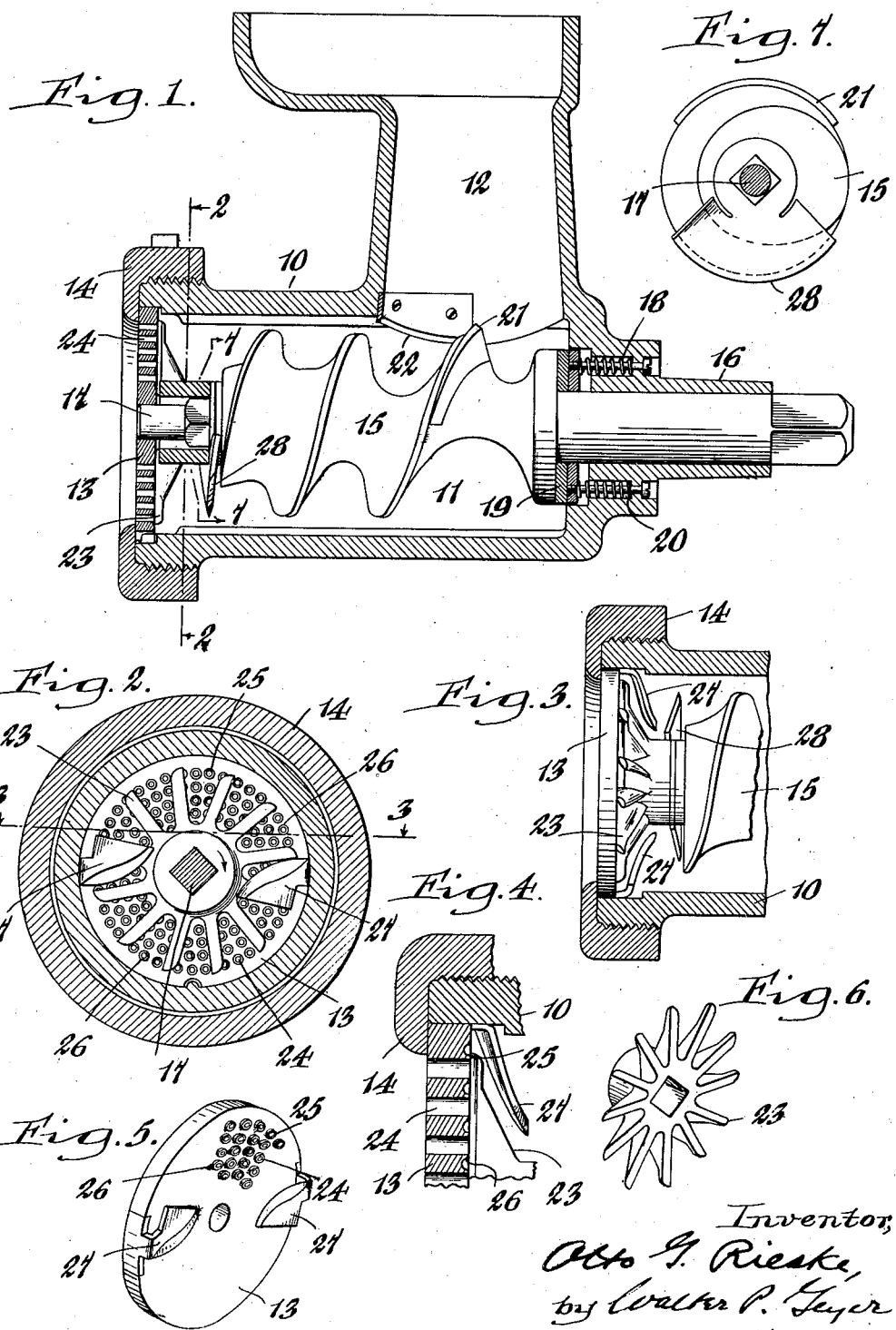
Inventor,
Otto G. Rieske,
by Walter P. Geyer
Attorney.

Patented Aug. 6, 1940

2,210,006

UNITED STATES PATENT OFFICE 2,210,006

FOOD GRINDING MACHINE

Otto G. Rieske, Buffalo, N. Y.

Application October 27, 1937, Serial No. 171,288

1 Claim. (Cl. 146—189)

This invention relates generally to improvements in food grinding or cutting machines and more particularly to that type of food grinder in which the food is fed by a screw or like element through a perforated plate and reduced to a comminuted mass or to minute particles suitable for domestic and other uses.

One of its objects is to provide a food-treating machine of this character having simple and efficient means for effecting the expeditious cutting and mixing of meat, cheese, cocoanut or other food particles as it is fed through the machine before being discharged through the perforated plate thereof.

Another object of the invention is to provide a food grinding machine which is simple, compact, and inexpensive in construction, and wherein the perforated discharge plate is provided with cutting edges projecting therefrom which cooperate with a knife mechanism so as to thoroughly cut the material into minute particles before it is discharged through the perforated plate.

Other features of the invention reside in the construction and arrangement of parts hereinafter described and particularly pointed out in the appended claim.

In the accompanying drawing:

Figure 1 is a central longitudinal section of the food grinding machine embodying my invention. Figure 2 is a cross-section thereof taken on line 2—2, Figure 1. Figure 3 is a cross-section taken on line 3—3, Figure 2. Figure 4 is an enlarged fragmentary cross-section similar to Figure 3. Figure 5 is a detached perspective view of the perforated discharge plate. Figure 6 is a similar view of the rotary cutter. Figure 7 is a cross-section taken on line 7—7, Figure 1.

Similar characters of reference indicate corresponding parts throughout the several views.

In the preferred embodiment of my invention shown in the drawing, the same consists of a casing 10 having a food-receiving chamber 11 of substantially cylindrical form containing an inlet at one end for the introduction of the food to be treated and a discharge at its opposite end for the treated food. The inlet of the casing is in the form of a hopper 12 rising from the rear end of the casing and opening at its lower end into the adjoining end of the food-receiving chamber, while fitted in the discharge end of the casing is a perforated plate 13 detachably held therein by an adjusting or retaining ring 14 threaded on the discharge end of the casing. As shown in Figure 1, the hopper-opening is, by preference, of substantially frusto-conical shape slightly flaring from its upper to its lower ends to facilitate the ready discharge of the food into the chamber 11 and reduce to a minimum any tendency of the food particles to cling to the walls of the hopper.

Operating in the food-receiving chamber 11 is a rotary feed means which may be in the form of a feed screw 15 and which serves to convey the food to be treated from the hopper end to the discharge end of the chamber. This feed screw may be driven by hand or in any other suitable manner, as by an electric motor, and is journaled at its rear end in a bearing portion 16 formed on the casing 10, while the front or spindle end 17 of the screw is supported in a bearing-opening in the perforated plate 13. In order to support the feed screw against objectionable endwise displacement and at the same time absorb its end thrust and permit its free rotation without undue resistance after screwing home the adjustable ring 14, I preferably interpose coil springs 18 between thrust washers 19 applied to the rear journal end of the feed screw and the bearing portion 16 of the casing, these springs being seated in sockets or recesses 20 formed in such portion.

To effect an initial reduction or cutting action on the food as it is introduced into the chamber 11, I provide that portion of the thread of the feed screw 15 which intersects or is disposed below the hopper-opening with a cutting edge 21 and the front side of the lower end of the hopper, substantially at its junction with the chamber, with a cutting edge or member 22. By this construction, as the food is passing from the hopper into the chamber and then axially of the latter, it is intercepted by the companion cutting edges 21, 22 which function to sever or break down the food into smaller pieces.

Mounted on the spindle 17 of the feed screw 15 to turn therewith is a rotary cutter or knife 23 consisting of a plurality of substantially radial blades which traverse the inner face of the perforated plate 13. This perforated plate is provided on its inner or knife-engaging face with cutting edges which project therefrom or from adjoining portions thereof for cooperative engagement with the rotary cutter to cut the food into minute particles before it is fed through the plate. By preference and to accomplish this purpose, each of the plate perforations 24 is provided about its inner end with a projection or collar 25, or conversely the face of the plate in the area about each perforation is cut out or gouged to form such a structure which defines about each perforation a concentric cutting edge 26 over which the respective blades of the rotary cutter travel. By this construction, during one revolution of the rotary cutter the material intercepted thereby is cut into minute particles and the food is comminuted or reduced to minimum-sized particles before passing through the perforated plate.

Applied to the inner side of the perforated plate 13 and preferably extending inwardly from the periphery thereof are a plurality of stationary blades or cutter elements 27, two being shown in the drawing by way of example, which overlie the inner face of the plate in approximately oblique or angular relation thereto and which are spaced from the plate a sufficient distance to provide an operating clearance for the rotary cutter 23. As shown in Figure 4, the leading or knife-like edges of these blades are spaced farther from the face of the plate than their trailing edges. In addition to their function of cutting the food intercepted thereby, they serve to deflect the food, by reason of their angular relation to the face of the perforated plate, firmly toward and against the latter, thereby effectually retaining the food against relative slippage during the operation of the rotary cutter traversing the cutting edges 26 on the perforated plate to cut the food into fine particles. Furthermore, the structural arrangement of these parts also effects a thorough mixing of the food particles before they are passed through the perforated discharge plate.

Applied to the front or discharge end of the feed screw 15 and constituting, in effect, a continuation of the screw thread thereof, is a spiral-like knife or cutter 28 which terminates short of the stationary blades 27 to provide the necessary operating clearance therefor. This spiral cutter likewise plays a part in the cutting of the material into smaller sizes before being cut into still smaller particles by the stationary knife and then into its final reduced state of minute particles effected by the rotary cutter 23 and the companion plate cutting edges 26.

I claim as my invention:

A machine of the character described, comprising a casing having a food-receiving chamber containing an inlet for the food to be treated and a discharge for the treated food, a rotary feed means in said chamber for conveying the food from the inlet to the discharge end thereof, a perforated plate at the discharge end of the chamber, and a rotary cutter traversing said perforated plate, the cutter-engaging face of said plate having collars projecting therefrom about the perforations and defining a plurality of concentric cutting edges cooperating with the rotary cutter and forming depressions about such edges, the inner face of the cutter being adapted to abut the ends of a plurality of the collars and the cutting edge of the cutter being disposed to move crosswise of the collars.

OTTO G. RIESKE.